Dec. 2, 1947.  O. L. DAVIS ET AL  2,431,793
MECHANICAL FAUCET MARKER
Filed Oct. 9, 1946  2 Sheets-Sheet 1
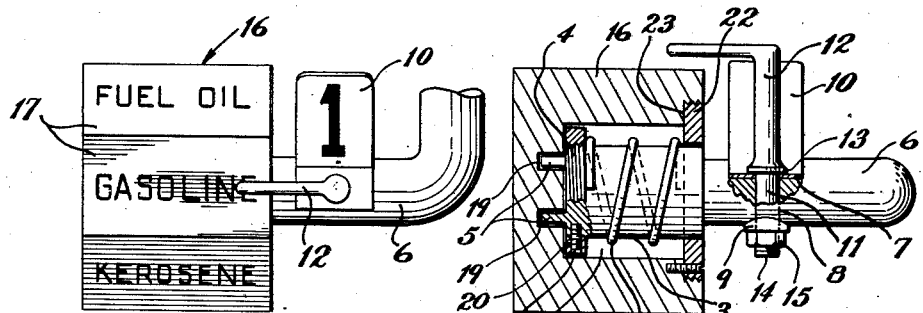
Fig. 1
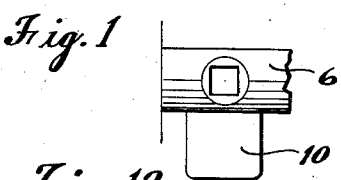
Fig. 13
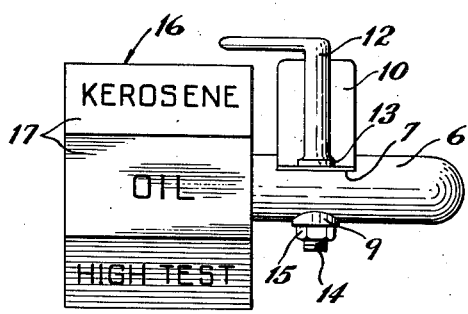
Fig. 2
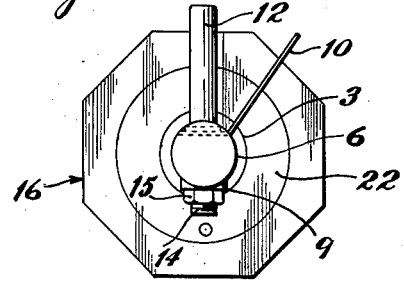
Fig. 12
Fig. 3
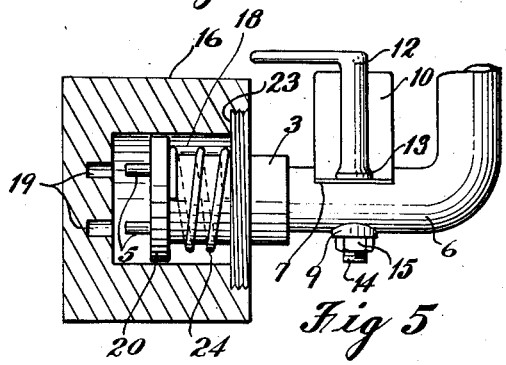
Fig. 5
Inventor
Oran L. Davis
Ralph E. Rice
By Clarence A. O'Brien
and Harvey B. Jacobson
Attorneys Dec. 2, 1947.　　O. L. DAVIS ET AL　　2,431,793
MECHANICAL FAUCET MARKER
Filed Oct. 9, 1946　　2 Sheets-Sheet 2

Inventor
Oran L. Davis
Ralph E. Rice

By Clarence A. O'Brien
and Harvey B. Jacobson
Attorneys

Patented Dec. 2, 1947

2,431,793

UNITED STATES PATENT OFFICE 2,431,793

MECHANICAL FAUCET MARKER

Oran L. Davis and Ralph E. Rice, Rochester, Minn., assignors of one-third to Alex P. Smekta, Rochester, Minn.

Application October 9, 1946, Serial No. 702,256

3 Claims. (Cl. 116—133)

This invention relates to improvements in mechanical faucet markers, the same being particularly adapted for use with a fuel discharge faucet on a tank truck.

An object of the invention is to provide an improved mechanical faucet marker which may be quickly adjusted to indicate the particular fuel which is stored in each tank or compartment in a multiple fuel tank truck.

Another object of the invention is to provide an improved selectively changeable mechanical faucet marker for indicating the particular fuel which is placed at the moment in a tank compartment in which several different fuels and grades of fuel may be stored.

A further object of the invention is to provide an improved rotatable selectively adjusted mechanical faucet marker for indicating the particular fuel in each compartment of a multiple compartment tank truck wherein each compartment may be used to store any of several different kinds and types of fuel.

Another object of the invention is to provide an improved mechanical faucet marker which will be highly efficient in operation, and relatively inexpensive to manufacture and produce.

Other objects will appear as the description proceeds.

In the accompanying drawings which form a part of this application,

Figure 1 is a plan view of the improved mechanical faucet marker;

Figure 2 is a side elevation of the improved mechanical faucet marker;

Figure 3 is an end elevation of the improved mechanical faucet marker;

Figure 4 is a partial vertical sectional view through the improved mechanical faucet marker, with parts thereof being broken away to show the positioning of the various parts;

Figure 5 is a vertical sectional view through the improved mechanical faucet marker showing the locking head pulled outwardly for changing the reading on said markers;

Figure 12 is a detail rear view of the tank indicating plate with indicator arm removed, and Figure 13 is a bottom plan view of a portion of the indicating arm and tank indicating plate thereon.

Like characters of reference are used throughout the following specification and the accompanying drawings to designate corresponding parts.

Figure 6:
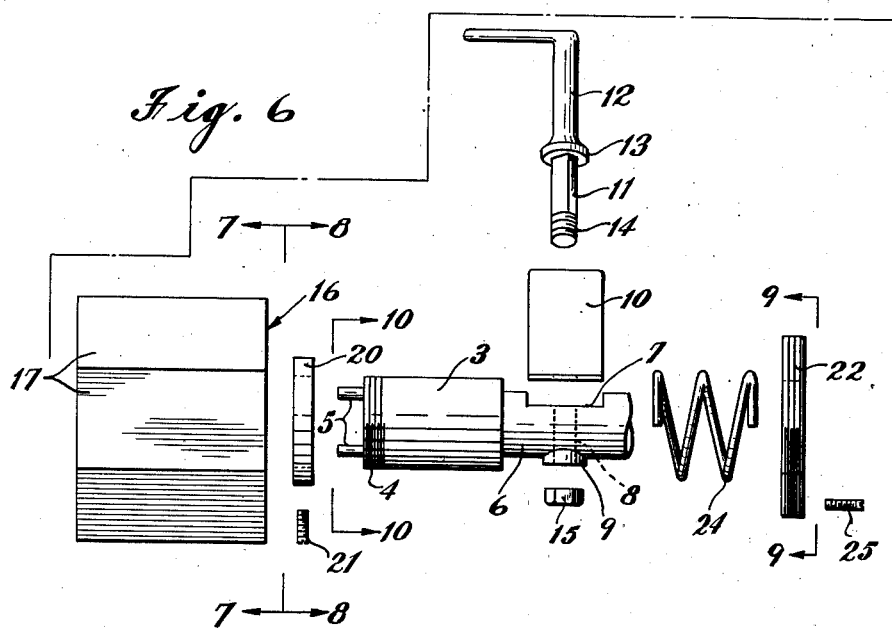
Figure 6 is an exploded view of the several parts of the improved mechanical faucet marker.
Figure 7:
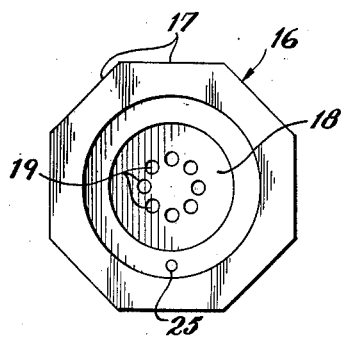
Figure 7 is a view taken on the line 7—7 of Figure 6.
Figure 8:
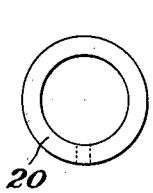
Figure 8 is a view taken on the line 8—8 of Figure 6.
Figure 9:
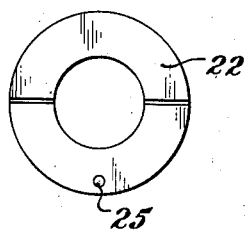
Figure 9 is a view taken on the line 9—9 of Figure 6.
Figure 11:
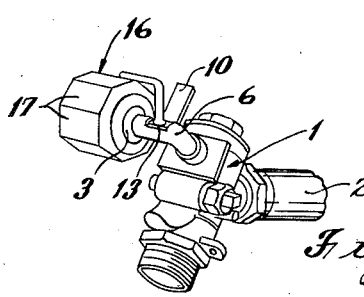
Figure 11 is a perspective view of the tank truck faucet with the improved mechanical faucet marker supported thereon.
Figure 10:
Figure 10 is a view taken on the line 10—10 of Figure 6.

In carrying out the invention, there is provided a tank truck faucet generally designated by the reference numeral 1, the same being connected by the pipe line 2 with a fuel tank (not shown) on a tank truck (also not shown).

The mechanical faucet marker will include a cylindrical body or shaft 3 having an L-shape extension on its inner end, being externally screw threaded at 4 on its outer end, and provided with the oppositely disposed outwardly extending positioning pins 5 in its outer end. A portion 6 of said body or shaft 3 will be of reduced diameter, and will be formed with a cut out seat 7 in one edge thereof, and a transverse bore 8 extending from said seat 7 will be formed through the portion 6, terminating in the boss 9. The inner end of the L-shaped body or shaft 3 will be attached in any desired manner to the head portion of the faucet 1.

An angled indicia bearing tank identifying plate 10 will be formed with a square aperture to seat on the seat 7 and to be supported thereon by means of a square shank 11 on the L-shaped indicating or positioning arm 12, the same being provided with the flange 13 engageable with said plate 10 and being threaded at 14 on its lower end which extends through the transverse bore 8 in the body or shaft 3, and is held locked thereto by means of the nut 15 which will be threaded upon the threaded portion 14 of said arm 12.

A rotatable octagonal hollow head 16 will be provided with the names of eigtht different kinds and types of fuels, being indicated upon the flat surfaces 17 thereof, and will be formed with an axial bore 18 in the base of which a series of circumferentially disposed locking seats or recesses 19 are formed, to be selectively engaged by the positioning pins 5.

An internally threaded guide or bearing ring 20 will be disposed upon the threaded outer end of the body or shaft 3, and will be held from turning by means of the locking set screw 21 extending radially through said ring and into said body.

A second guide or bearing ring 22 of larger diameter than said ring 20 will be externally threaded to engage and seat in the threaded enlarged bore and seat 23 in the inner end of the axial bore 18 in said head 16, while a coil spring 24 will be disposed about the body or shaft 3 between said guides or bearing rings 20 and 22 to force the body or shaft 3 inwardly to retain the positioning pins 5 in the desired locking seats or recesses 19. A set screw 25 will extend through the ring 22 and into the head 16 to lock the said ring in fixed position to prevent the same from accidental rotation.

Should a different fuel be placed in a compartment other than is usually placed therein, the head 16 will be pulled outwardly against the tension of the coil spring 24 until the pins 5 are free from the seats or recesses 19, and the head will then be turned until the name of the fuel placed in the compartment is opposite the indicator arm 12, at which time the head 16 to move inwardly to again reseat said pins 5 in the recesses 19.

From the foregoing description, it will be apparent that there has been devised and provided a highly efficient form of mechanical faucet marker construction for fuel trucks and other purposes, which may be manufactured and produced at a relatively inexpensive cost.

While the preferred embodiment of the instant invention has been illustrated and described, it will be understood that it is not intended to limit the scope of the invention thereto, as many minor changes in detail of construction may be resorted without departure from the spirit of the invention.

Having thus described our invention what we claim as new and desire to secure by Letters Patent of the United States is:

1. A mechanical faucet marker comprising a supporting body, an indicating pointer finger supported thereby, a head having indicia bearing surface rotatably mounted on said body, means for selectively aligning the desired surfaces with said pointer, locking fingers on said body engageable with said head for holding the same in adjusted position, and a coil spring about said body having its ends in engagement with said body and head for resiliently holding said locking fingers in engagement with said head while holding the same in adjusted position.

2. The subject matter as claimed in claim 1, a guide ring seated in said head, a second guide ring disposed about the end of said body, and said coil spring disposed about said body having its ends positioned against said guide rings.

3. The subject matter as claimed in claim 1, a guide ring seated in said head, a second guide ring disposed about the end of said body, means for locking said guide rings in position, said coil spring disposed about said body having its ends positioned against said guide rings, and interchangeable tank identifying plates supported on said body.

ORAN L. DAVIS.
RALPH E. RICE.

REFERENCES CITED

The following references are of record in the file of this patent:

UNITED STATES PATENTS

| Number | Name | Date |
|---|---|---|
| 1,455,547 | Needham | May 15, 1923 |
| 2,279,715 | Nagel | Apr. 14, 1942 |
| 2,350,733 | Drotning | June 6, 1944 |